(12) United States Patent
Pliner et al.

(10) Patent No.: US 9,130,384 B2
(45) Date of Patent: Sep. 8, 2015

(54) SMART PHONE AND/OR CONSUMER ELECTRONICS DEVICE CHARGER SYSTEM

(71) Applicant: Prong, Inc., New York, NY (US)

(72) Inventors: Yishai Z. Pliner, New York, NY (US); Lloyd Gladstone, Boca Raton, FL (US)

(73) Assignee: Prong, Inc., New York, NY (US)

( * ) Notice: Subject to any disclaimer, the term of this patent is extended or adjusted under 35 U.S.C. 154(b) by 0 days.

(21) Appl. No.: 13/633,600

(22) Filed: Oct. 2, 2012

(65) Prior Publication Data
US 2013/0150134 A1 Jun. 13, 2013

Related U.S. Application Data

(60) Provisional application No. 61/544,194, filed on Oct. 6, 2011, provisional application No. 61/605,118, filed on Feb. 29, 2012.

(51) Int. Cl.
H04M 1/04 (2006.01)
H02J 7/00 (2006.01)
H01R 24/68 (2011.01)
H04M 1/02 (2006.01)

(52) U.S. Cl.
CPC .............. *H02J 7/0042* (2013.01); *H01R 24/68* (2013.01); *H04M 1/026* (2013.01)

(58) Field of Classification Search
CPC ....... H02J 7/02; H02J 17/00; H02J 2007/006; H02J 7/0042; H02J 7/0052; H02J 7/0055; H02J 7/025; H02J 7/0044; H04M 1/04; H04B 1/388

USPC ...................... 455/573, 572, 575.1, 90.3, 128; 320/114, 111, 107, 166
See application file for complete search history.

(56) References Cited

U.S. PATENT DOCUMENTS

| 4,743,829 A | 5/1988 | Fenne et al. |
| 4,794,315 A | 12/1988 | Pederson et al. |
| 5,162,719 A | 11/1992 | Tomura et al. |
| 5,525,888 A | 6/1996 | Toya |
| 5,611,701 A | 3/1997 | Hahn |
| 5,628,641 A | 5/1997 | Hahn |
| 5,648,712 A | 7/1997 | Hahn |
| 5,713,749 A | 2/1998 | Wu |
| 5,780,993 A | 7/1998 | Tsang |
| 5,814,973 A * | 9/1998 | Liu ............................. 320/137 |

(Continued)

FOREIGN PATENT DOCUMENTS

| CN | 2750591 Y | 1/2006 |
| CN | 101752717 A | 6/2010 |

(Continued)

OTHER PUBLICATIONS

Francois Rybarczyk, "*HTC Autonome Concept Mobile Phone*", Yanko Design; http://www.yankodesign.com/2012/02/07/direct-power/ Feb. 9, 2012, pp. 5-8.

*Primary Examiner* — Minh D Dao

(74) *Attorney, Agent, or Firm* — Troutman Sanders, LLP

(57) ABSTRACT

A consumer electronics device charging device having a pair of rotatable blades, wherein the blades are rotatable from a deployed position in which ends of the blades are inserted into a standard wall outlet to a retracted position in which the ends of the blades are spread apart from one another and lie flat against the charger to decrease the overall thickness of the charger.

7 Claims, 24 Drawing Sheets

(56) References Cited

U.S. PATENT DOCUMENTS

| | | | |
|---|---|---|---|
| 5,838,554 A | 11/1998 | Lanni | |
| 5,847,545 A * | 12/1998 | Chen et al. | 320/138 |
| 6,191,553 B1 | 2/2001 | Feng-Jung | |
| 6,241,538 B1 | 6/2001 | Chen | |
| 6,483,273 B1 * | 11/2002 | Lee | 320/111 |
| 6,489,746 B1 * | 12/2002 | Pettinato | 320/111 |
| 6,504,343 B1 * | 1/2003 | Chang | 320/124 |
| 6,585,530 B2 | 7/2003 | Steiert et al. | |
| 6,628,641 B1 | 9/2003 | Strawczynski et al. | |
| 6,632,098 B1 * | 10/2003 | Wong et al. | 439/131 |
| 6,762,425 B1 * | 7/2004 | Strait | 250/504 R |
| 6,909,259 B2 * | 6/2005 | Chung | 320/107 |
| 7,166,987 B2 | 1/2007 | Lee et al. | |
| 7,481,660 B1 | 1/2009 | Tsai | |
| 7,489,952 B2 | 2/2009 | Simoes et al. | |
| 7,510,409 B2 | 3/2009 | Yu | |
| 7,519,402 B2 | 4/2009 | Son | |
| 7,628,621 B2 | 12/2009 | Tsai | |
| 7,756,268 B2 | 7/2010 | Hazani et al. | |
| 7,812,771 B2 * | 10/2010 | Greene et al. | 343/702 |
| 7,938,653 B2 | 5/2011 | Hopwood et al. | |
| 8,378,625 B2 * | 2/2013 | Gourley | 320/107 |
| 8,712,482 B2 * | 4/2014 | Sorias et al. | 455/572 |
| 8,712,486 B2 * | 4/2014 | Sorias et al. | 455/575.1 |
| 2002/0171396 A1 * | 11/2002 | Pettinato | 320/111 |
| 2003/0030342 A1 * | 2/2003 | Chen et al. | 310/102 R |
| 2003/0218445 A1 * | 11/2003 | Behar | 320/114 |
| 2004/0036449 A1 * | 2/2004 | Bean et al. | 320/166 |
| 2004/0266495 A1 | 12/2004 | Ou | |
| 2005/0046385 A1 * | 3/2005 | Chung | 320/114 |
| 2006/0058073 A1 | 3/2006 | Kim | |
| 2007/0099681 A1 | 5/2007 | Kielland | |
| 2007/0123315 A1 | 5/2007 | Williams | |
| 2008/0051160 A1 | 2/2008 | Seil et al. | |
| 2008/0084147 A1 * | 4/2008 | Brown | 312/223.3 |
| 2008/0234013 A1 | 9/2008 | Bury | |
| 2008/0238366 A1 | 10/2008 | Kohata | |
| 2009/0023481 A1 | 1/2009 | Foster et al. | |
| 2009/0096411 A1 * | 4/2009 | Vanska et al. | 320/107 |
| 2009/0186666 A1 | 7/2009 | Bury | |
| 2010/0048260 A1 | 2/2010 | Bury | |
| 2010/0285847 A1 | 11/2010 | Greer et al. | |
| 2011/0159930 A1 | 6/2011 | Garrett et al. | |
| 2011/0279084 A1 * | 11/2011 | Tao et al. | 320/114 |
| 2012/0101551 A1 * | 4/2012 | Aghassian et al. | 607/60 |
| 2012/0178506 A1 * | 7/2012 | Sorias et al. | 455/573 |
| 2012/0312196 A1 * | 12/2012 | Newkirk | 108/23 |
| 2013/0005401 A1 * | 1/2013 | Rosenhan et al. | 455/557 |
| 2013/0117158 A1 * | 5/2013 | Cvek | 705/26.63 |
| 2013/0231791 A1 * | 9/2013 | Jacobs | 700/291 |
| 2013/0298039 A1 * | 11/2013 | Mestre | 715/753 |
| 2013/0300348 A1 * | 11/2013 | Schwartz et al. | 320/107 |
| 2013/0327904 A1 * | 12/2013 | Christal | 248/176.1 |

FOREIGN PATENT DOCUMENTS

| | | |
|---|---|---|
| CN | 201514988 U | 6/2010 |
| JP | 201068591 A | 3/2010 |
| WO | WO 2012/097118 A1 | 7/2012 |

* cited by examiner

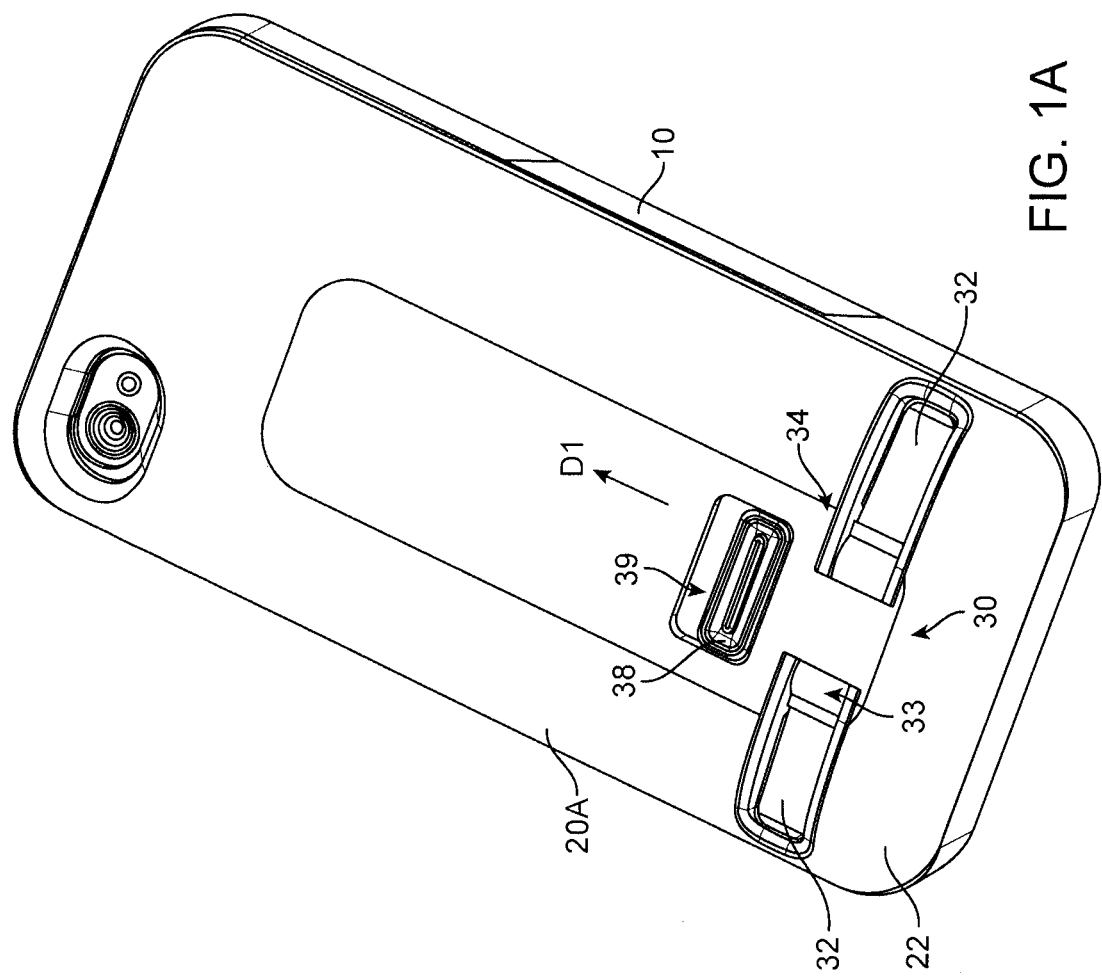

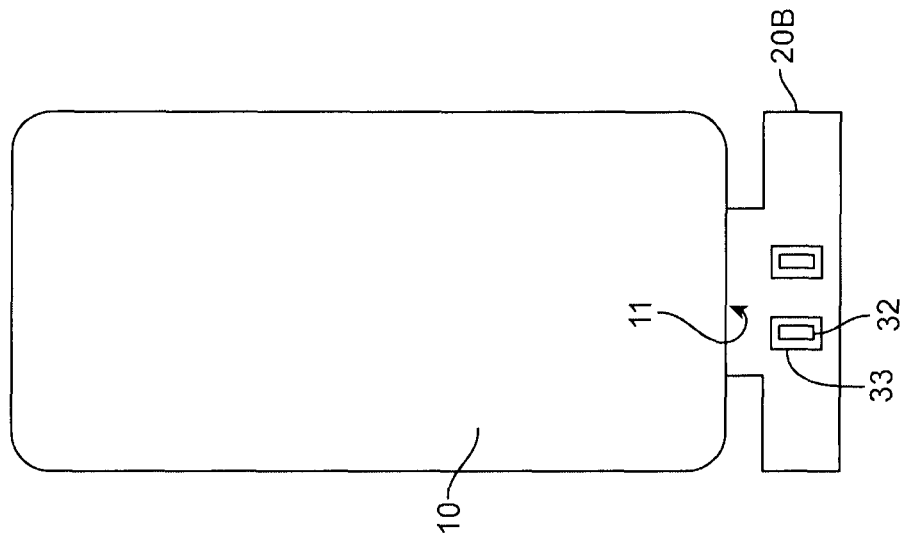
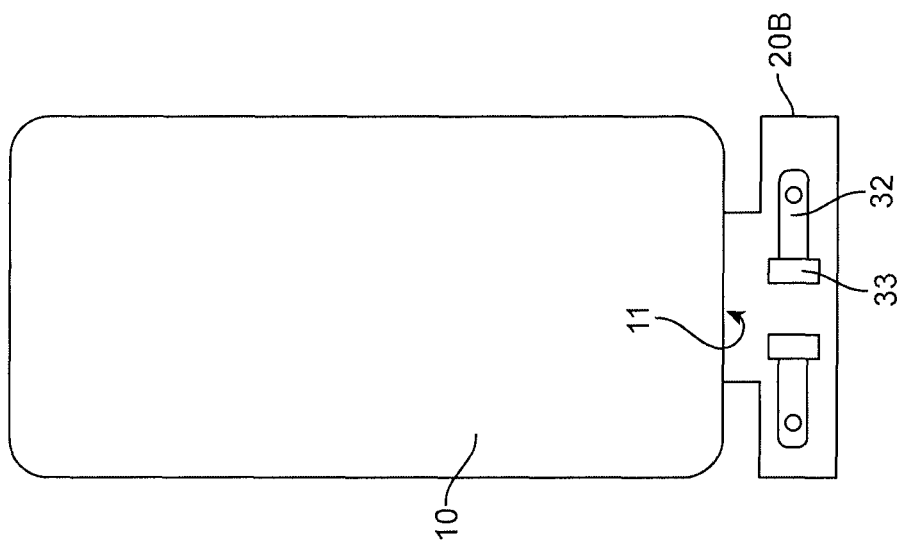

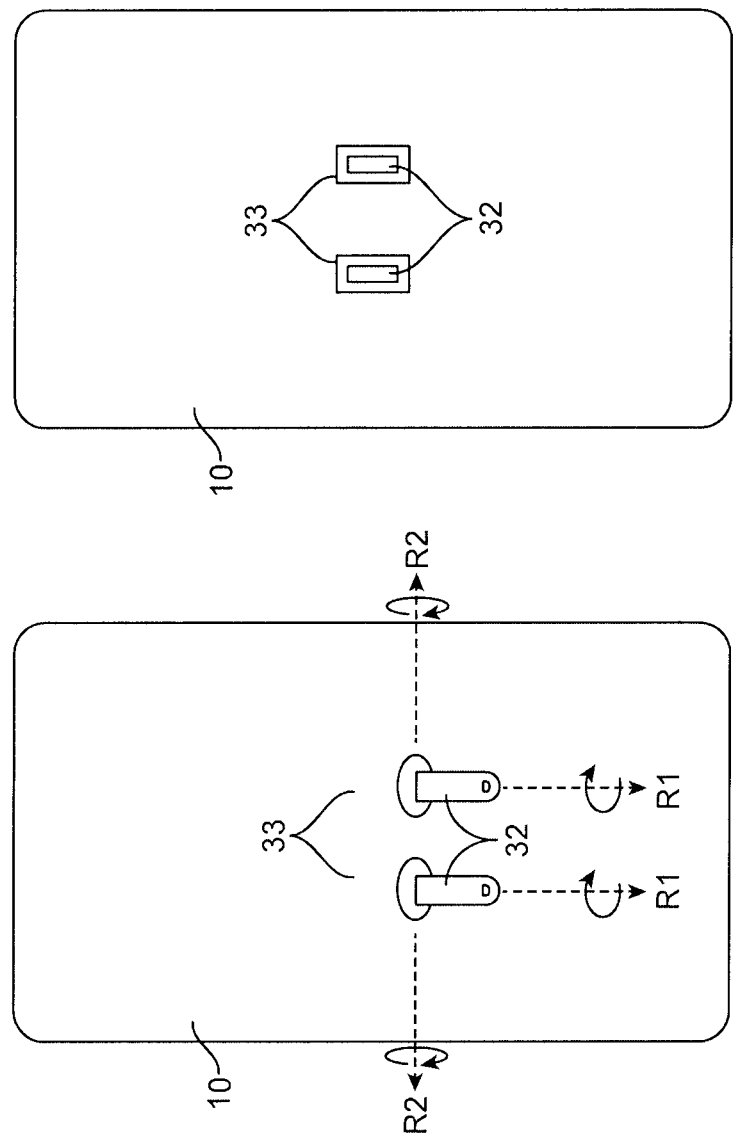

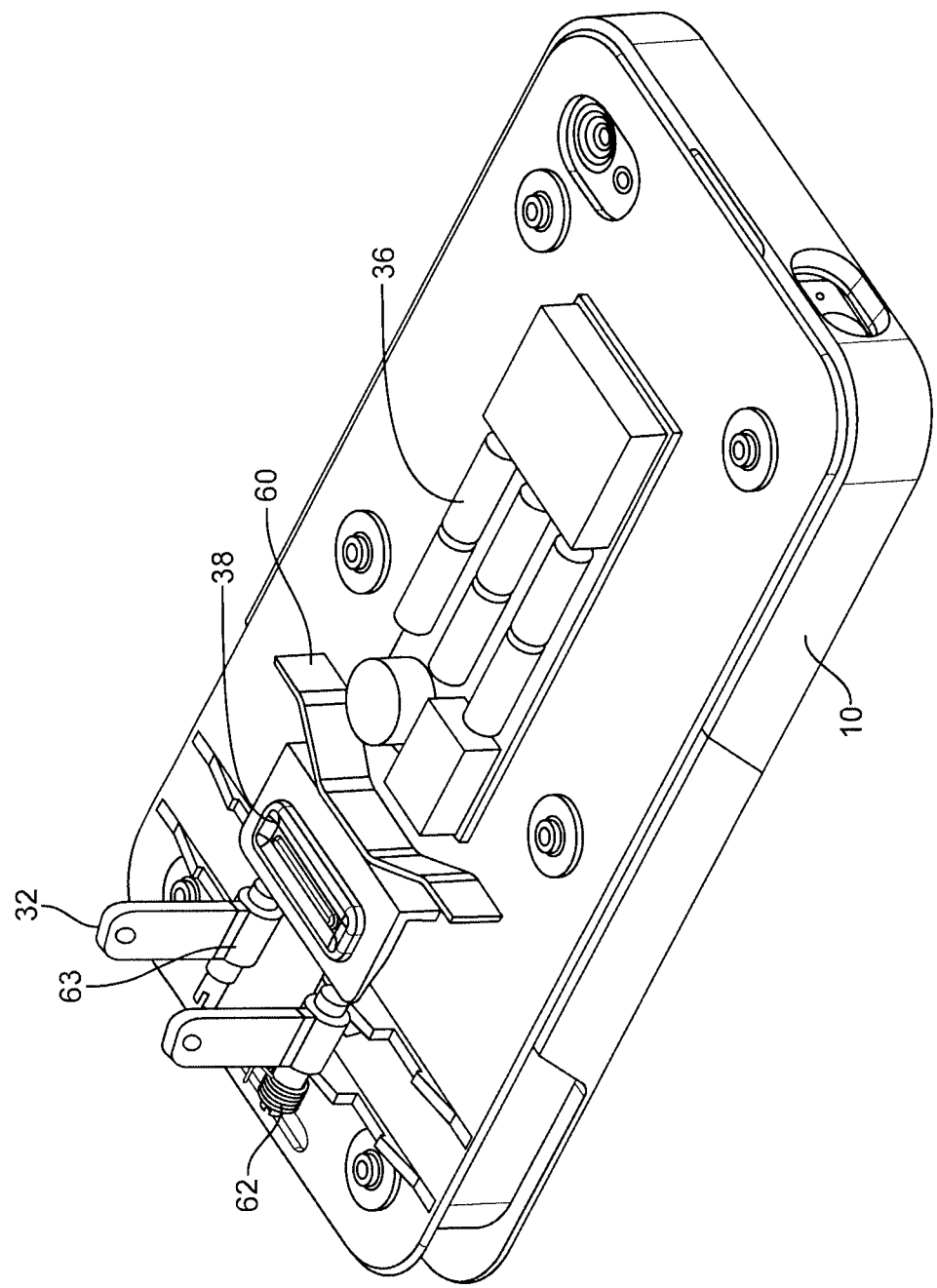

SMART PHONE AND/OR CONSUMER ELECTRONICS DEVICE CHARGER SYSTEM

RELATED APPLICATION

The present application claims priority to U.S. Provisional Patent Applications 61/544,194, filed Oct. 6, 2011, entitled "Smart Phone Charger System," and to 61/605,118, filed Feb. 29, 2012, entitled "Smart Phone and/or Consumer Electronics Device Charger System," for which both applications are incorporated herein by reference in their entirety.

TECHNICAL FIELD

The present invention relates to chargers for electronic devices such as smart phones (including iPhones™, iPads™, etc.), and also to chargers for other consumer electronics devices.

BACKGROUND OF THE INVENTION

People rely more and more on their smart phones and these devices are being used for more and more hours of the day. Unfortunately, smart phones tend to be "battery hogs" that consume a significant amount of energy. In many regards, the biggest limitation to these devices is their (relatively short) battery life. They all typically require a daily charging.

Numerous charging devices already exist for phones and smart phones. Typically, these charging devices include standard plug-in wall cords, and/or power cords that plug into computer USB ports. Many users do not find it convenient to rely on these long charging cables. It's inconvenient to carry them around, and it's also inconvenient to always have to return your smart phone to the same spot to charge it up at the end of the day. Therefore, other solutions on the market include battery packs that fasten directly onto the phone or are connected to the phone by a short plug in cable. The main problem with these devices is their added bulk and weight.

An example of a charging device for a consumer electronics product is found in U.S. Pat. No. 7,938,653. This device is simply a folding plug at the end of a charging cord. The plug has a pair of plug blades that fold down one on top of the other. The blades rotate in the same direction as they are deployed. This blade folding arrangement unfortunately requires a deep trough into which both blades are folded (one sitting on top of another). In addition, this trough extends fully out the side of the device such that the user must insert their finger and pull upwardly on one of the blades, thereby causing both blades to rotate into position. A primary disadvantage of this system is that the two blades are folded one on top of another. This requires a deep channel/trough into which both blades must be folded. Another disadvantage of this system is that this channel/trough must extend fully out of the side of the device. In addition, one of the blades must have its tip positioned near the end of the channel/trough at the side of the device such that the user's fingers can grip onto it. As a result, the position of the two blades is effectively fixed with respect to the sides of the device.

It would instead be desirable to overcome the limitations of the '653 patent's folding plug blades. For example, it would be desirable to provide a plug that can be stored without requiring a deep channel into which two blades are folded one on top of one another. It would also be desirable to provide a system in which the user does not have to grasp onto the ends of one of the blades to deploy them. Instead, it would be desirable to provide a system in which the blades automatically deploy at the push of a button under the user's command. It would also be desirable to provide a system in which the blades can be centrally located on the back of the device being charged if desired. Lastly, it would be desirable to completely avoid the charging cord itself, for example when charging an iPhone™ or other smart phone.

What is instead desired when charging smart phones in particular is a system that uses standard wall power AC outlets, but also avoids the use of a large, bulky extra battery pack. It is also desirable for such a system to completely avoid the use of long power cables running from a charger to the device being charged.

SUMMARY OF THE INVENTION

The present invention provides a charging device having a pair of rotatable blades or pins. The blades are rotatable from a deployed position in which ends of the blades are inserted into a standard AC wall outlet to a retracted position in which the ends of the blades are spread apart from one another and lie flat against the charger to decrease the overall thickness of the charger.

The most important advantage of the present invention is that it reduces the overall thickness of the charger itself. Specifically, the plug-in blades are rotated from the parallel orientation (i.e.: in which they are inserted in a standard wall outlet) down to a flattened orientation in which they are instead positioned in the same plane.

In various embodiments, the present rotatable plug charger is built into (or onto) the body of the smart phone. Alternatively, it may be a separate device that is connected onto the back or bottom of the smart phone. As will be shown, however, the present folding blade charging device can also be used with other suitable consumer electronics devices (for example, battery rechargers, electric toothbrushes, shavers, etc.). In further embodiments, it may be a separate device that is attached by a short cable to the smart phone.

BRIEF DESCRIPTION OF THE DRAWINGS

FIG. 1A is a bottom perspective view of a first embodiment of the invention in a retracted position.

FIG. 5A is a rear view of a second embodiment of the invention in a retracted position.

FIG. 5B is a rear view of a second embodiment of the invention in a deployed position.

FIG. 11A is a rear view of a sixth embodiment of the invention with the blades in a retracted position.

FIG. 11B is a rear view of the sixth embodiment of the invention with the blades in a deployed position.

FIG. 14 is a perspective view corresponding to FIG. 12 (with the blades deployed).

DETAILED DESCRIPTION OF THE DRAWINGS

Figure 13:
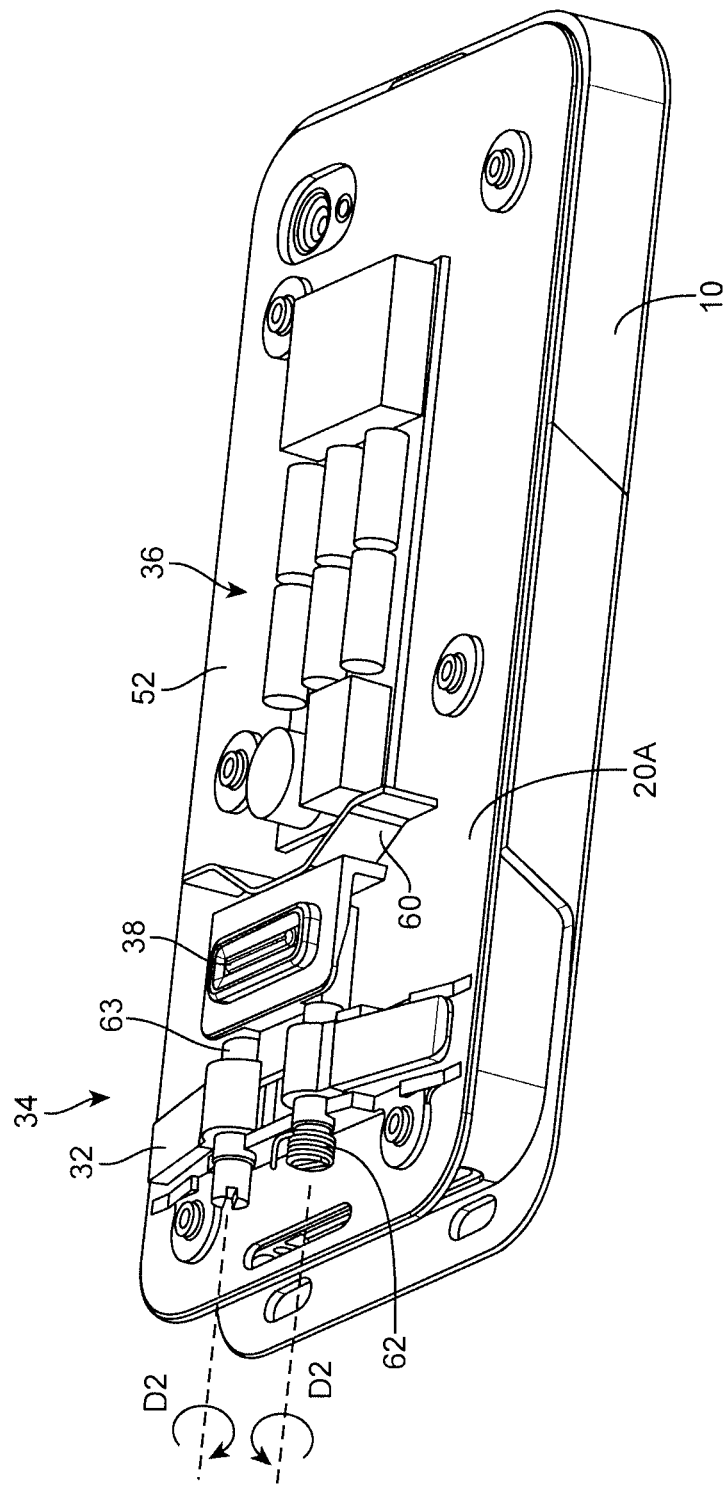
FIG. 13 is a perspective view corresponding to the bottom inside case of FIG. 12.
Figure 15A:
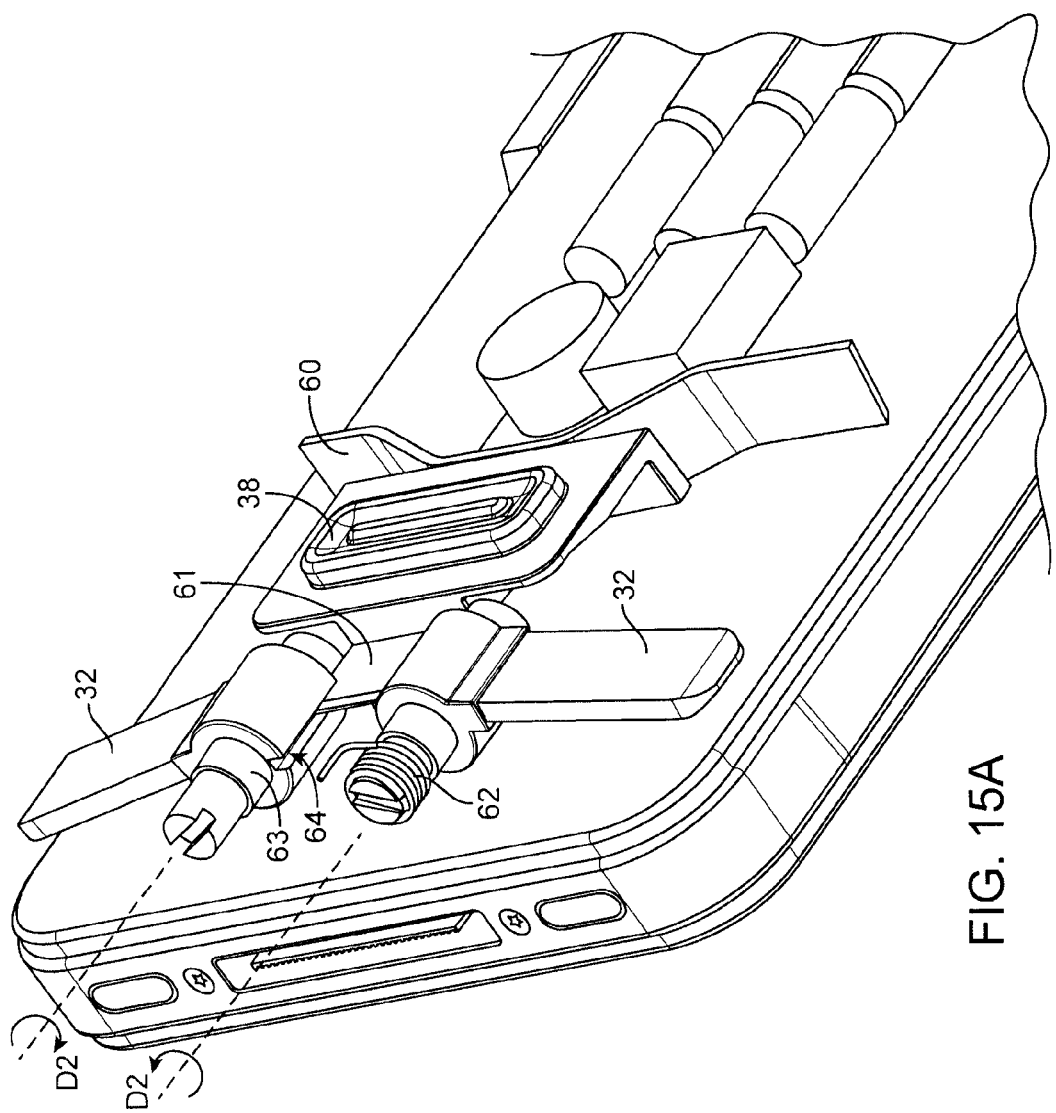
FIG. 15A is a close up view corresponding to FIGS. 13 and 14.
Figure 15B:
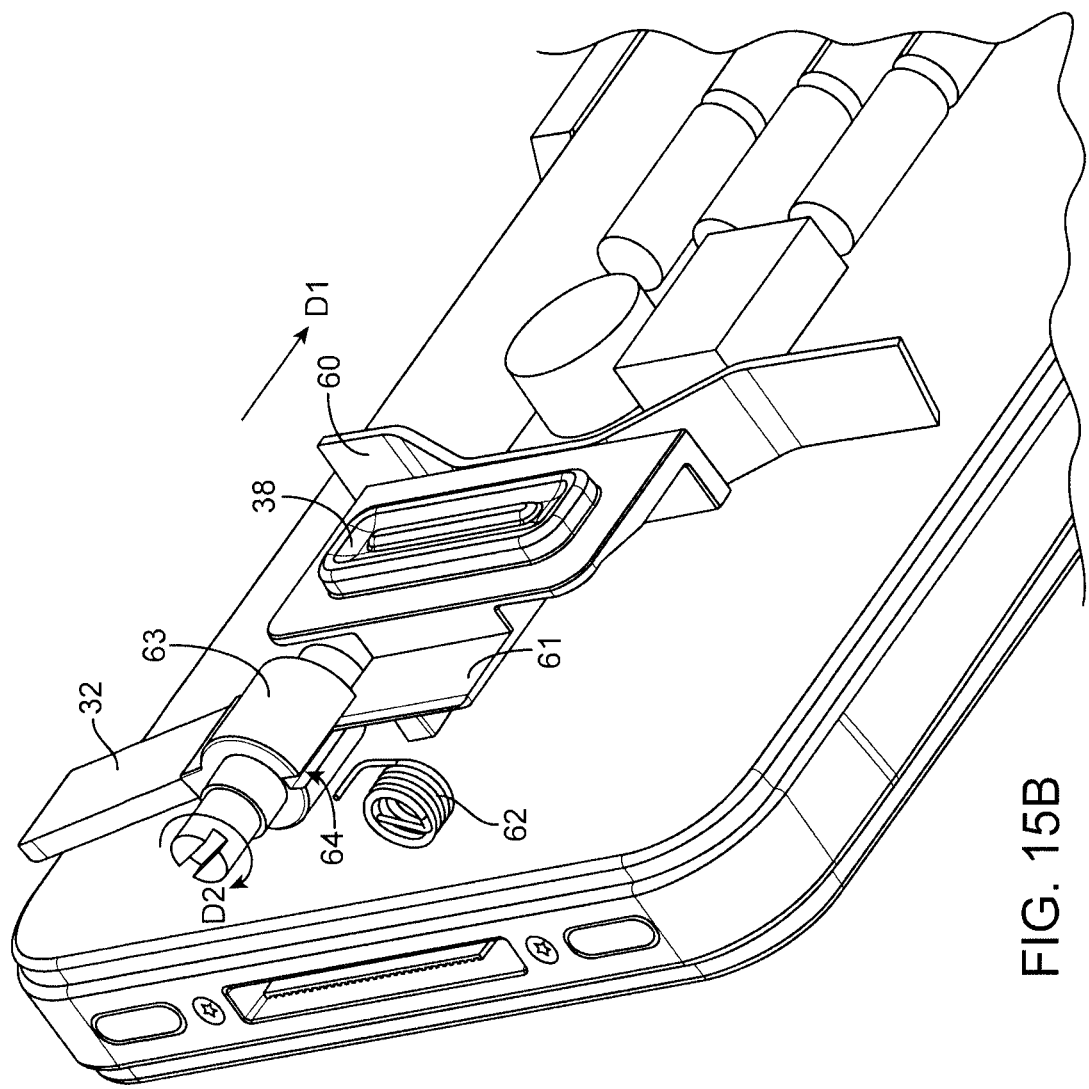
FIG. 15B is a view similar to FIG. 15A, but with various parts removed for clarity to show operation of the device.

FIGS. 1A to 4B show a first embodiment of the invention in which a charging device is attached directly to the back of a smart phone, as follows. Smart phone 10 includes charger 20A mounted thereto. Charger 20A comprises a housing 22 with a plug unit 30 disposed therein. Plug unit 30 has a pair of rotatable blades 32. Blades 32 are rotatable from a retracted position in which the ends of the blades are spread apart from one another (as seen in FIGS. 1A, 2A, 3A and 4A) to a deployed position in which ends of the blades are positioned to be received within a wall outlet (as seen in FIGS. 1B, 2B, 3B and 4B). Plug unit 30 also comprises a mechanism 34 for rotating the blades from the retracted position to the deployed position. As will be shown, mechanism 34 can be composes of various elements, and it is to be understood that the present invention is not limited to any particular embodiment. Also included with plug unit 30 is electrical circuitry 36 (shown in FIGS. 13 and 14) in the housing connecting blades 32 of plug unit 30 to the internal battery of phone 10.

As can be seen in FIGS. 1A, 2A, 3A and 4A, blades 32 are preferably disposed in the same plane (or almost in the same plane) when in the retracted position. As can be seen in FIGS. 1B, 2B, 3B and 4B, blades 32 are disposed in parallel planes when in the deployed position. When it is time to re-charge phone 10, the user simply causes blades 32 to rotate into their deployed position. Preferably, this is done by pulling switch 38 back in socket 39 in direction D1. As will be explained, this movement of switch 38 will release blades 32 such that they automatically rotate from their retracted position (FIG. 1A) to their deployed position (FIG. 1B). Preferably, blades 32 will be biased to rotate (in opposite directions) throughout their full range of travel (i.e.: from their retracted to deployed positions). Note: it is to be understood that the term "biased" as used herein is understood to mean being pushed, pulled or otherwise urged to move in a preferred direction by any means including, but not limited to spring action. Then, the phone 10 (with charger 20A attached thereto) is simply plugged into a standard AC wall outlet for recharging. This arrangement avoids the need for long power cables. Quite simply, a user just plugs their smart phone into the wall to recharge it. In various embodiments, the phone battery may itself be within the phone 10 or within the charger 20A. In one preferred aspect, phone 10 is an Apple iPhone™. It is to be understood, however, that the present invention is not limited to any particular model or brand of smart phone. In fact, as illustrated herein, the present invention can also be used to charge devices other than smart phones (e.g.: plug-in battery rechargers, toothbrushes, electric shavers, etc.). As such, it is ideal to charge any electrical device where size, weight and space are at a premium.

The present invention provides various systems for moving blades 32 between retracted and deployed positions. In one example, blades 32 may be mounted onto a spring (or otherwise) biased rotatable member 33. Thus, members 33 simply rotate by 90 degrees (or approximately 90 degrees) to move blades 32 between retracted and deployed positions. Various mechanisms 34 for activating movement of members 33 will be described herein.

In various preferred embodiments, blades 32 are geared together such that have to work in unison. In such embodiments, a user simply depressing one blade 32 will cause the other blade 32 to move as well. This embodiment is especially convenient such that the user does not need to hold down both blades 32 to push them into a retracted position.

In yet another preferred embodiment, the charging circuit is not activated until both blades 32 are deployed. With this safety feature, there is no danger that the charging circuit can be turned on until both blades are firmly in their deployed position.

FIGS. 5A and 5B show rear views of a second charger 20B. In FIG. 5A, blades 32 are shown in their retracted position. In FIG. 5B, blades 32 are shown in their deployed position. Charger 20B has the advantage of being smaller than charger 20A. Charger 20A is preferably plugged into the bottom of phone 10. Most preferably, charger 20B is simply plugged into the standard 30 pin power cable connector 11 on the bottom of Phone™ 10. A further advantage of this second embodiment of the charger is that it can be removed and a standard power re-charging cable can be used instead (should the user want both options). All the user needs to do is to unplug charger 20B from connector 11, and insert the end of a standard power cable into connector 11.

Figure 1B:
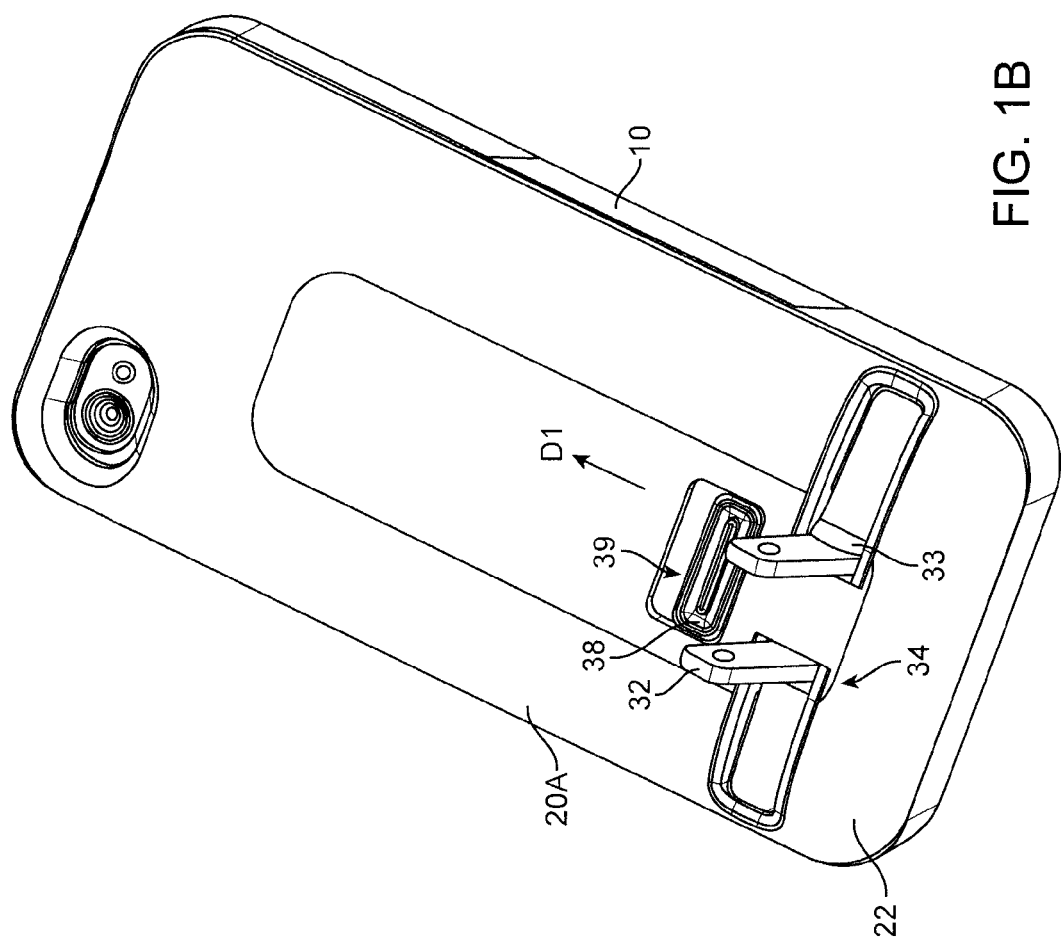
FIG. 1B is a bottom perspective view of the first embodiment of the invention in a deployed position.
Figure 1C:
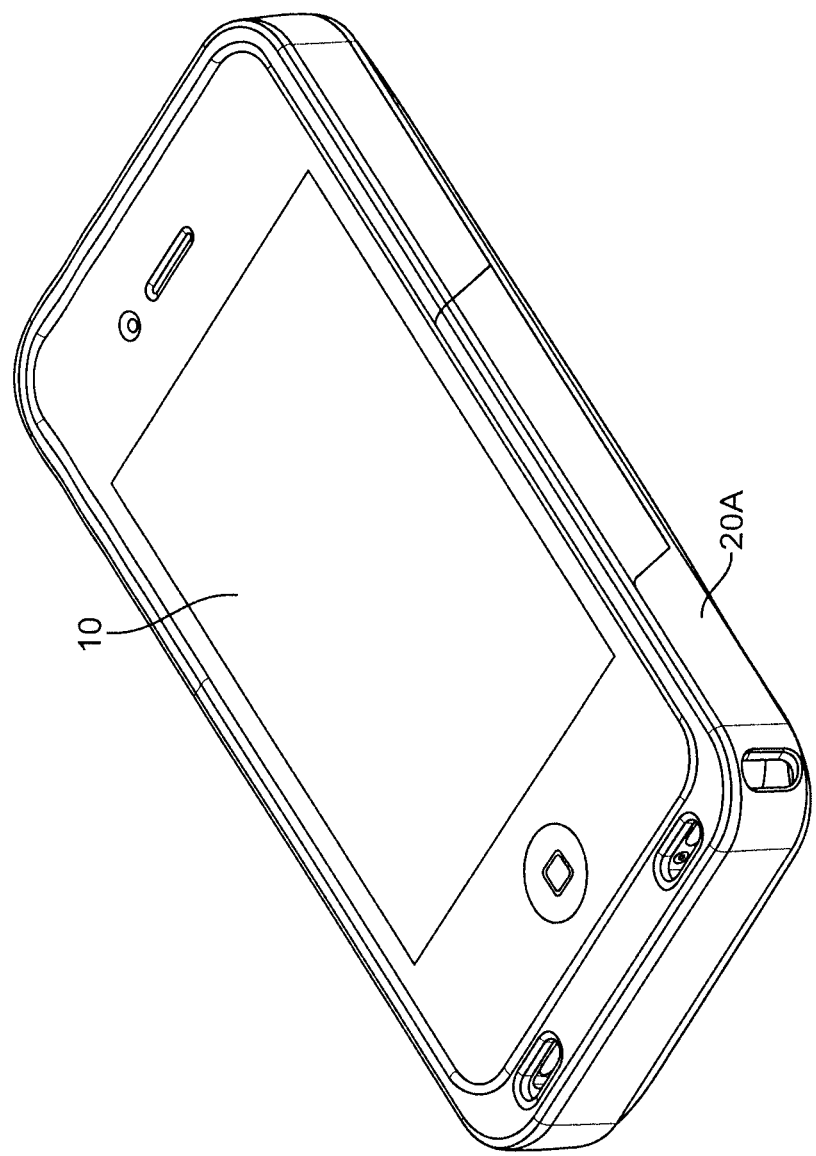
FIG. 1C is a top perspective view of the first embodiment of the invention.
Figure 2A:
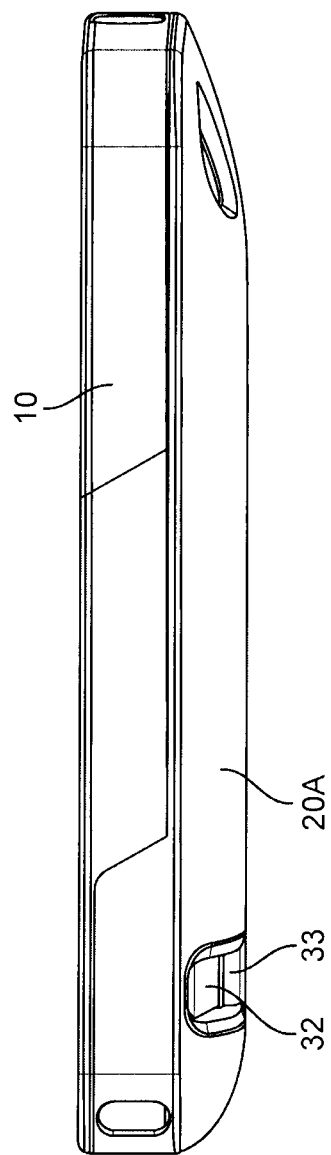
FIG. 2A is a side view of the first embodiment of the invention in a retracted position.
Figure 2B:
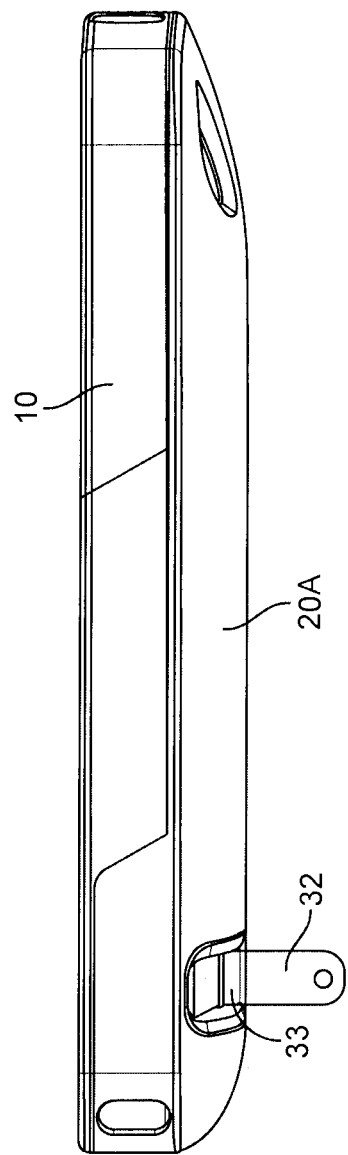
FIG. 2B is a side view of the first embodiment of the invention in a deployed position.
Figure 3A:
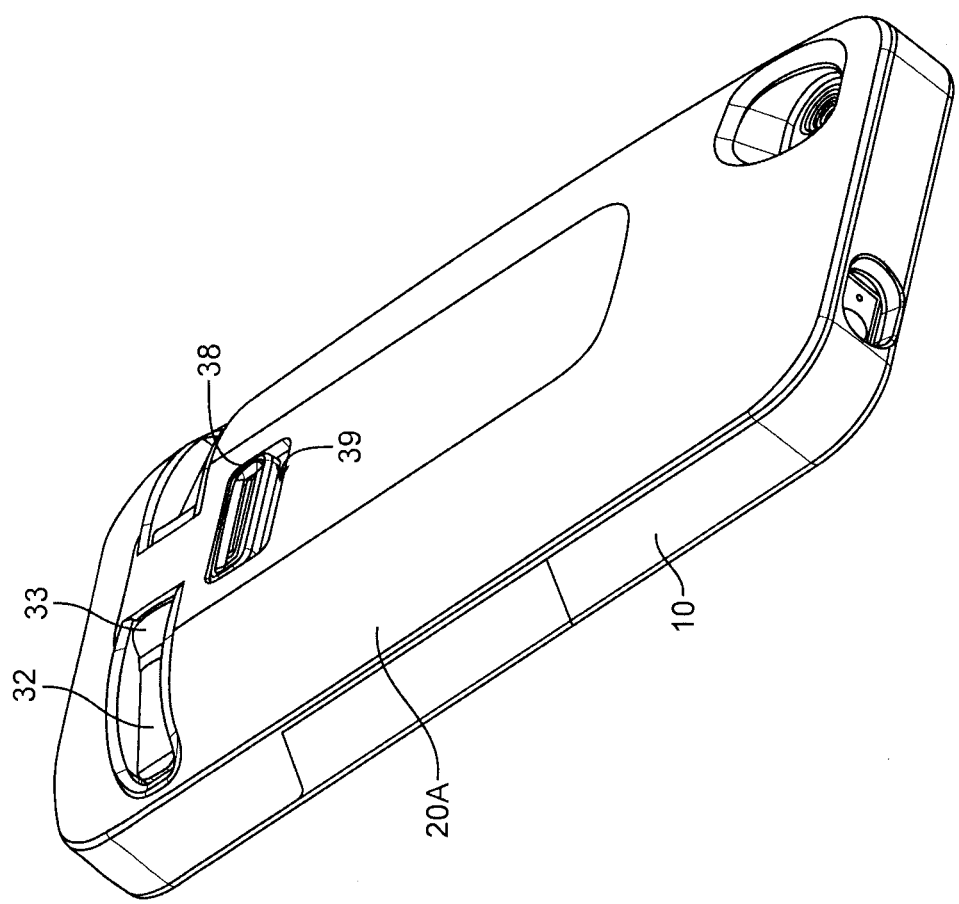
FIG. 3A is a top perspective view of the first embodiment of the invention in a retracted position.
Figure 3B:
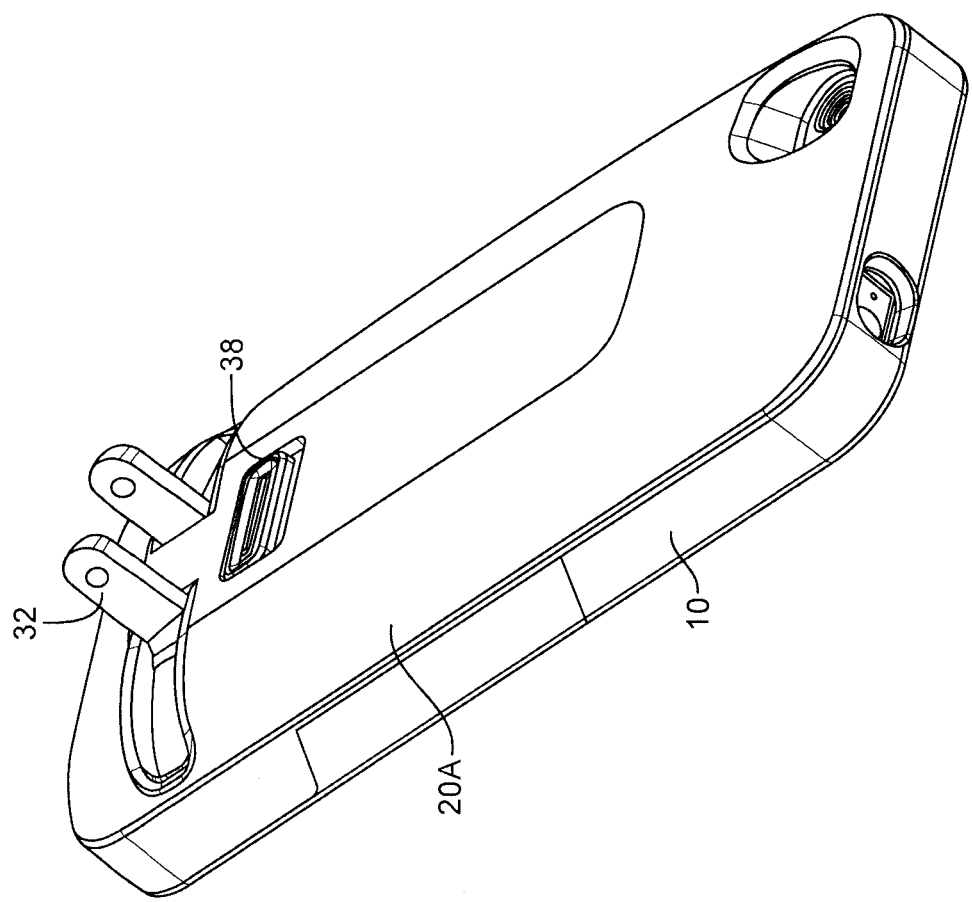
FIG. 3B is a top perspective view of the first embodiment of the invention in a deployed position.
Figure 4A:
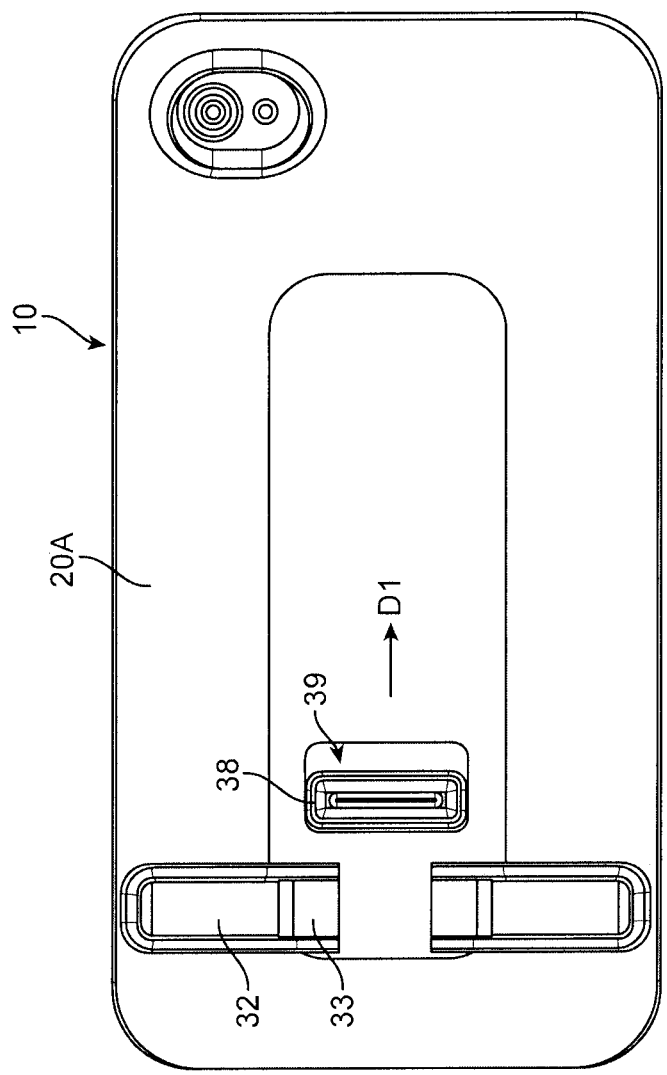
FIG. 4A is a rear view of the first embodiment of the invention in a retracted position.
Figure 4B:
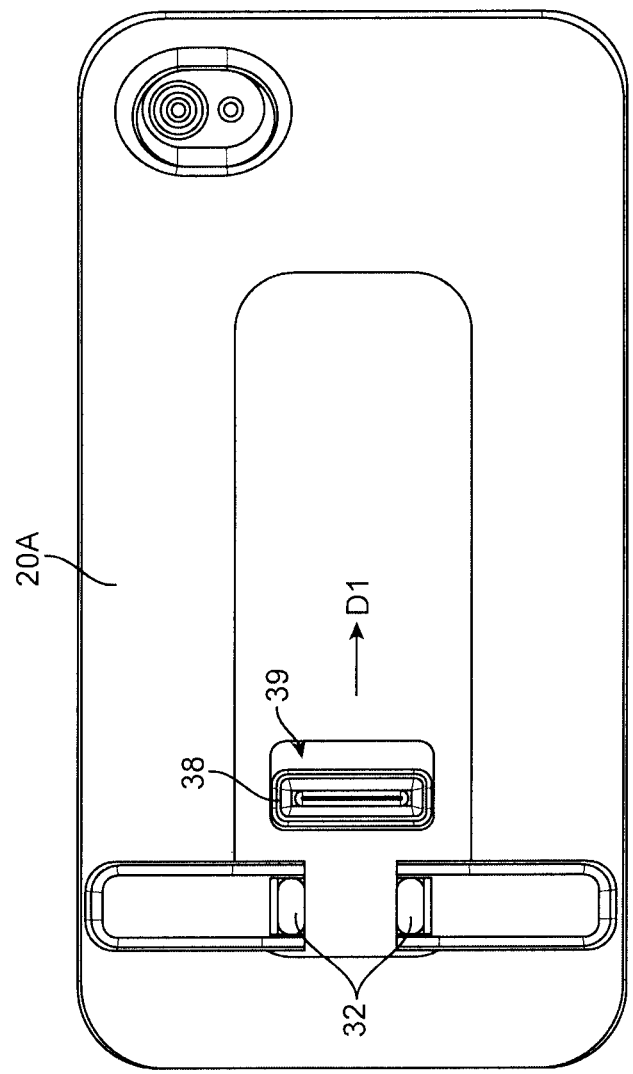
FIG. 4B is a rear view of the first embodiment of the invention in a deployed position.
Figure 6A:
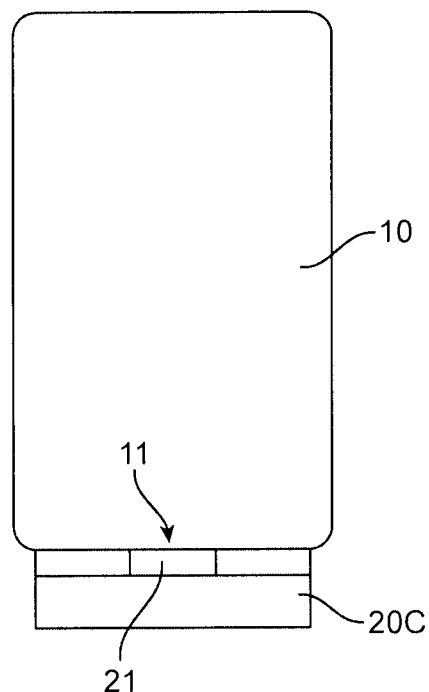
FIG. 6A is a front view of a third embodiment of the invention.
Figures 6B, 6C:
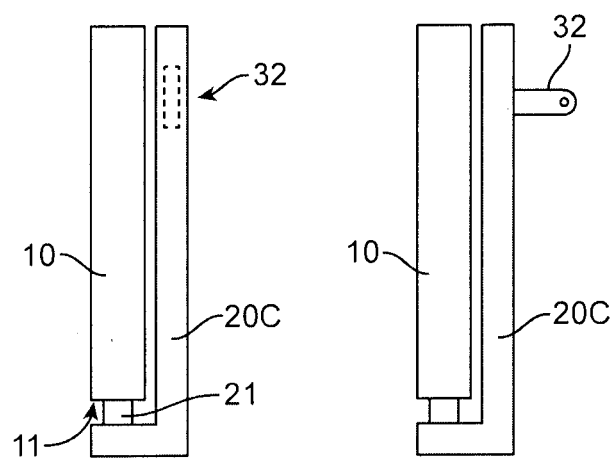
FIG. 6B is a side view of the third embodiment of the invention in a retracted position.
FIG. 6C is a side view of the third embodiment of the invention in a deployed position.

FIGS. 6A to 6C show a third embodiment of the present charging system. Charger 20C provides a "cradle" for phone 10 as it charges. Specifically, charger 20C deploys blades 32 (using mechanisms as described above). Phone 10 is plugged onto electrical component 21 that is received into standard 30 pin connector 11. Thus, phone 10 simply sits in the cradle formed by charger 20C which is then plugged into a standard AC wall outlet.

Figure 7:
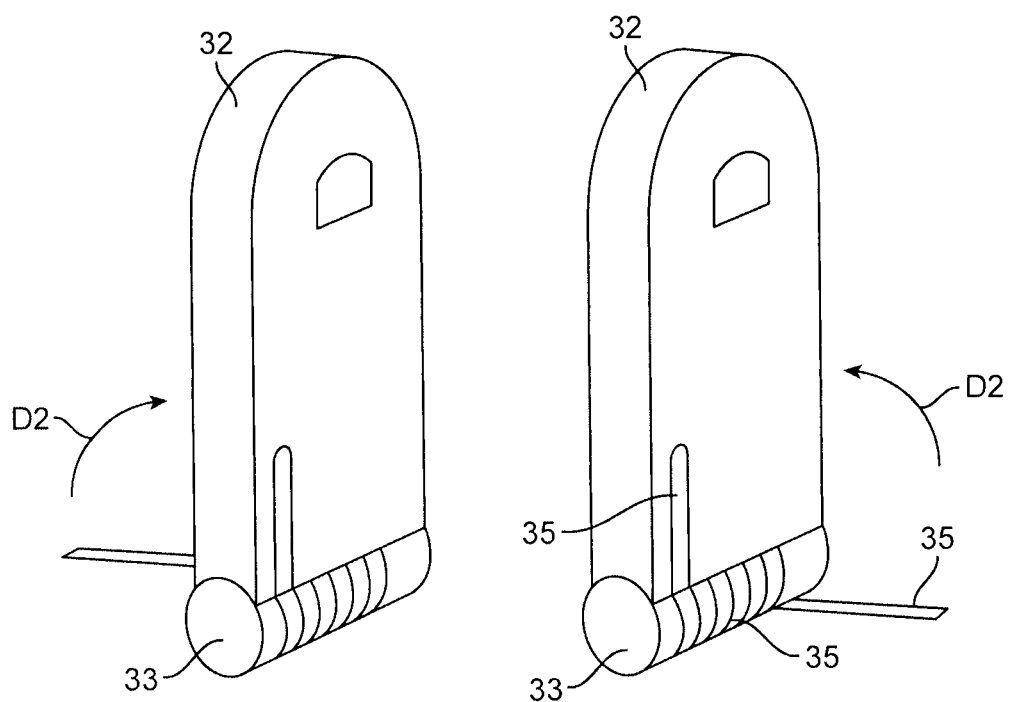
FIG. 7 is a close-up view of the rotating plug blades showing a spring biasing mechanism.

FIG. 7 shows a close up of an exemplary biasing mechanism in which a spring 35 urges blades 32 (in direction D2) into their deployed position. Spring 35 acts as an electrical conductor thereby permitting each of blades 32 to be mounted onto a non-conducting rotatable element 33. The spring-biasing approach shown in FIG. 7 can be used with various mechanisms described below that simply hold blades 32 in the retracted position until they are released.

Figure 8A:
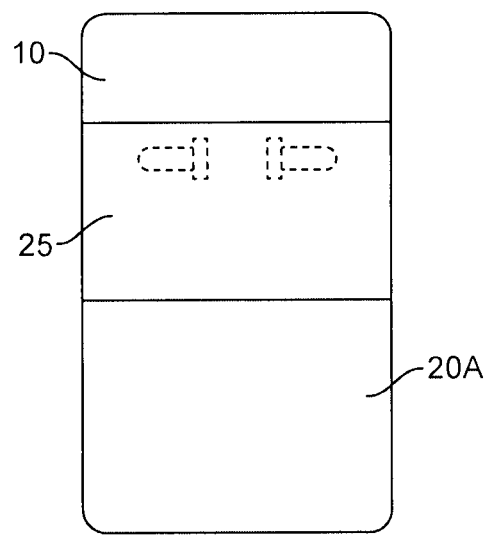
FIG. 8A is a rear view of a fourth embodiment of the invention in a first position.
Figure 8B:
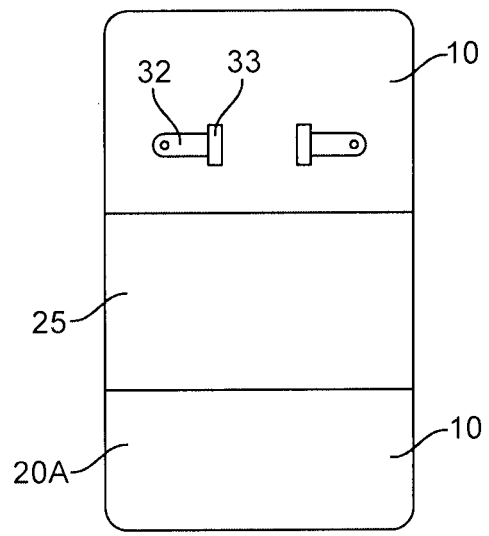
FIG. 8B is a rear view of a fourth embodiment of the invention in a second position with the blades in a retracted position.
Figure 8C:
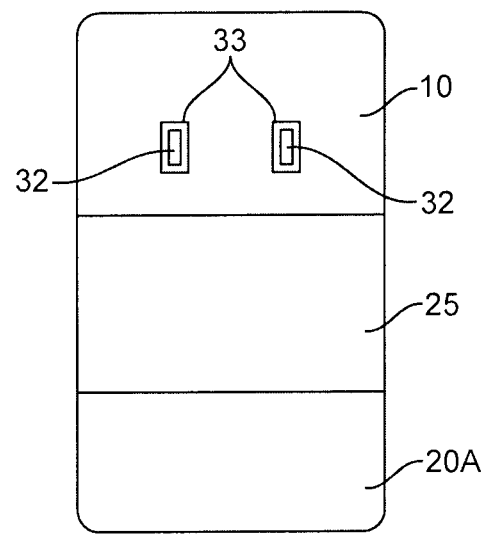
FIG. 8C is a rear view of a fourth embodiment of the invention in a second position with the blades in a deployed position.

For example, FIGS. 8A to 8C show a charger 20A on the back of phone 10. Charger 20A includes a moveable sliding section 25. In FIG. 8A, slide 25 covers blades 32 (keeping them in their retracted position). Next, slide 25 is moved to the position shown in FIG. 8B, exposing blades 32. Since blades 32 are spring biased, they will immediately rotate to the deployed position shown in FIG. 8C.

Figure 9:
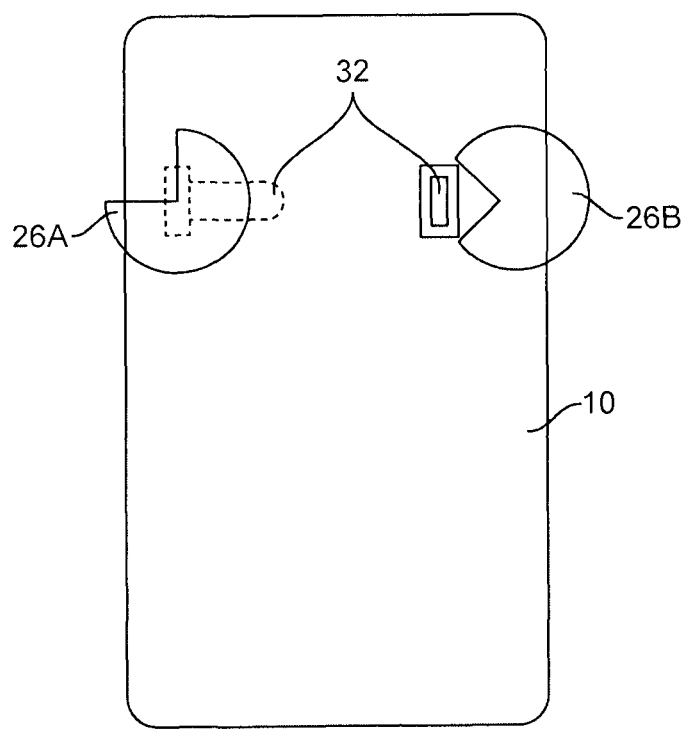
FIG. 9 is a schematic view of another system for releasing the plug blades for deployment.

In another approach, FIG. 9 shows a schematic of two rotatable wheels 26A and 26B. When the wheel is in the position shown by wheel 26A, it will keep blade 32 in its retracted position. However, when the wheel is rotated to the position shown by wheel 26B, it will then release blade 32, and blade 32 will spring into its deployed position.

Figure 10B:
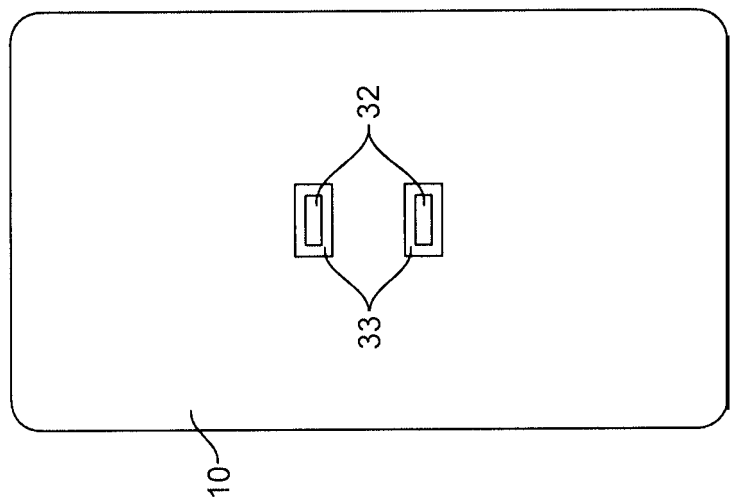
FIG. 10B is a rear view of the fifth embodiment of the invention with the blades in a deployed position.
Figure 10A:
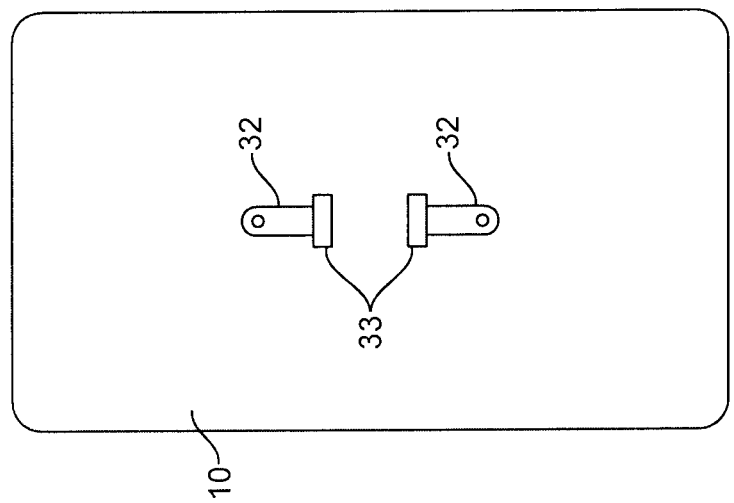
FIG. 10A is a rear view of a fifth embodiment of the invention with the blades in a retracted position.

FIGS. 10A and 10B illustrate another embodiment of the invention. This embodiment is similar to that of FIGS. 1A to 4B, however, the orientation of the plugs 32 has been rotated by 90 degrees. The advantage of this design is that the iPhone™ is itself rotated when charging and now sits sideways when plugged into the wall socket. As a result, the adjacent second AC wall socket is not blocked by the iPhone™, and is clear to be used.

FIGS. 11A and 11B illustrate yet another embodiment of the invention. In this embodiment, plugs 32 lay flat against the back of smart phone 10 when in their retracted position (FIG. 11A). Next, the plugs are both rotated upwardly and twisted when moved into their deployed position (FIG. 11B). Note: In this embodiment, each rotatable member 33 rotates 90 degrees about both axes R1 and R2.

It is to be understood that other options for rotating blades 32 between their retracted and deployed positions are also possible. For example, blades 32 need not be biased. Instead, they may be simply rotated by manually turning a wheel or lever. They may also simply be manually rotated by a user individually grasping onto the blades one by one and rotating them into position. Alternatively, the blades can be geared together such that movement of one causes the other to move (this has the advantage that only one blade needs to be depressed to move both blades into their retracted position). It is also to be understood that the various mechanisms described herein may be used to rotate blades 32 together or individually. A "click down to release" biasing option is also available, as will be explained below.

Figure 12:
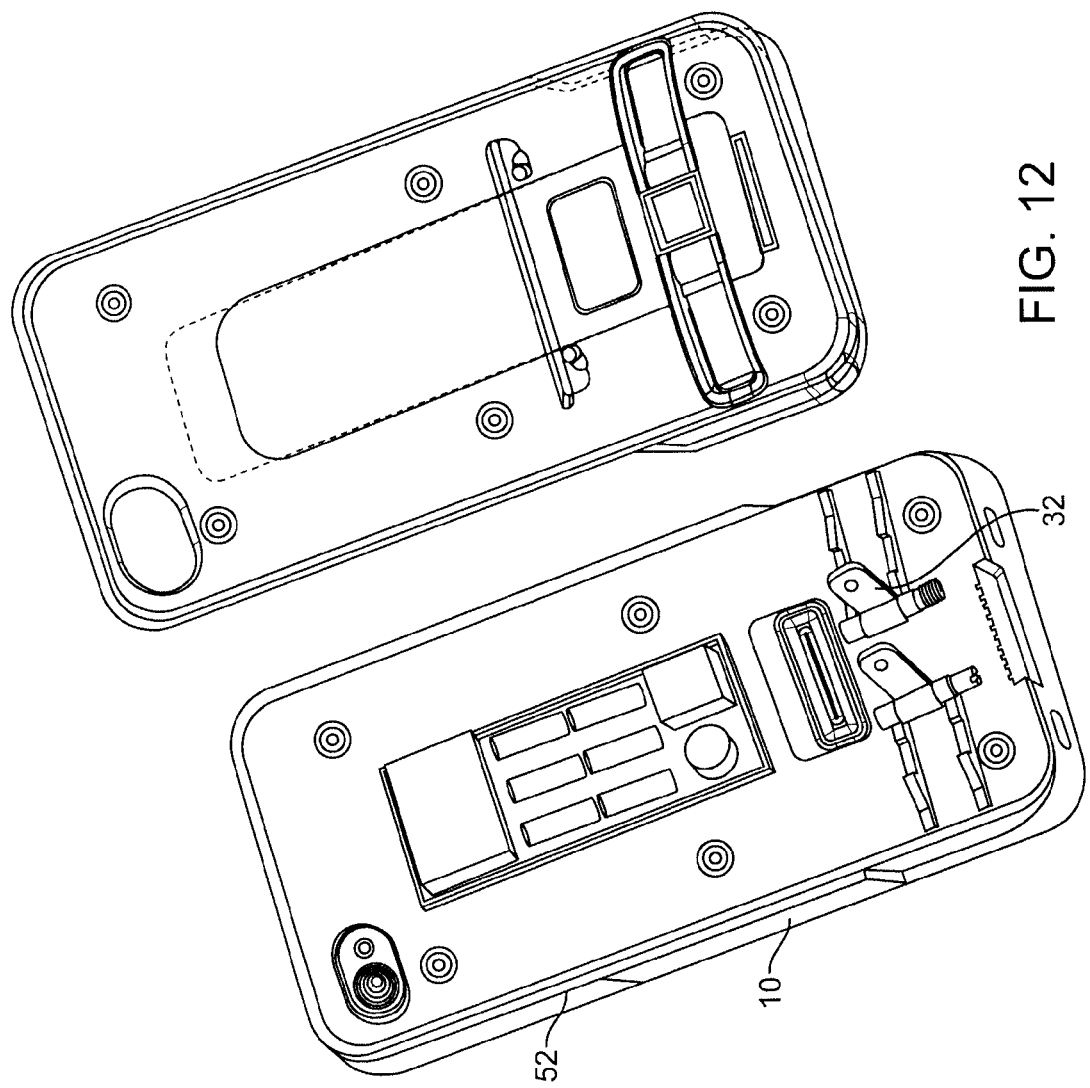
FIG. 12 is an illustration of the back of the first embodiment of the invention with the back case removed and the blades shown in their deployed position.

FIG. 12 is an exploded view of an embodiment of the invention showing the bottom comprises of a bottom outside case 50 and a bottom inside case 52. Blades 36 are shown in their deployed position.

FIGS. 13 to 15B show further details of mechanism 34 for rotating the blades from the retracted position to the deployed position (with outside case 50 removed for clarity), as follows. Mechanism 34 comprises a biasing spring 60 which pushes switch 38 forward. Switch 38 has a forward extension 61 projecting therefrom. Each blade 32 is biased to rotate in direction D2 by a spring 62 (only one is shown). Preferably, this biasing occurs through the full range of motion from the retracted to the deployed positions. In addition, each blade 32 is held on a roller 63 that has a slot 64 running therealong. As seen most clearly in FIG. 15B, forward extension 61 is received into slot 64 when blade 32 is in its retracted position. Next, when switch 38 is pulled back (in direction D1), spring 60 will be compressed and forward extension 61 will slip out of slot 64. This action releases blade 32 to rotate in direction D2 (into its fully deployed position) by spring 62.

After use (i.e.: when the blades 32 are removed from the wall outlet), the user simply depresses blades 32 to their retracted position. At this time, biasing spring 60 will slide forward extension 61 back into slot 64 thereby holding the blades back in their retracted position. One particular advantage of this system is that only a simple one finger push and slide of switch 38 is required for blades 32 to be automatically deployed. The user does not have to grab onto the blades and pull them out to deploy them. Thus, there is no need for a blade slot that reaches the side of the device. Instead, the tips of blades 32 can be positioned away from the edges of the device when they are in their retracted position. Moreover, the user's finger moves in direction D1 (i.e.: away from the deploying blades) as the blades deploy. Thus, there is no danger of the blades springing out and hitting the user's fingers. Advantageously as well, there is no need with the present invention for one blade to be folded on top of the other. Instead, each can be separately received in its own shallow receptacle on the back of the phone when they are in their retracted position. This advantageously minimizes the depth/thickness of the overall device.

Figure 16A:
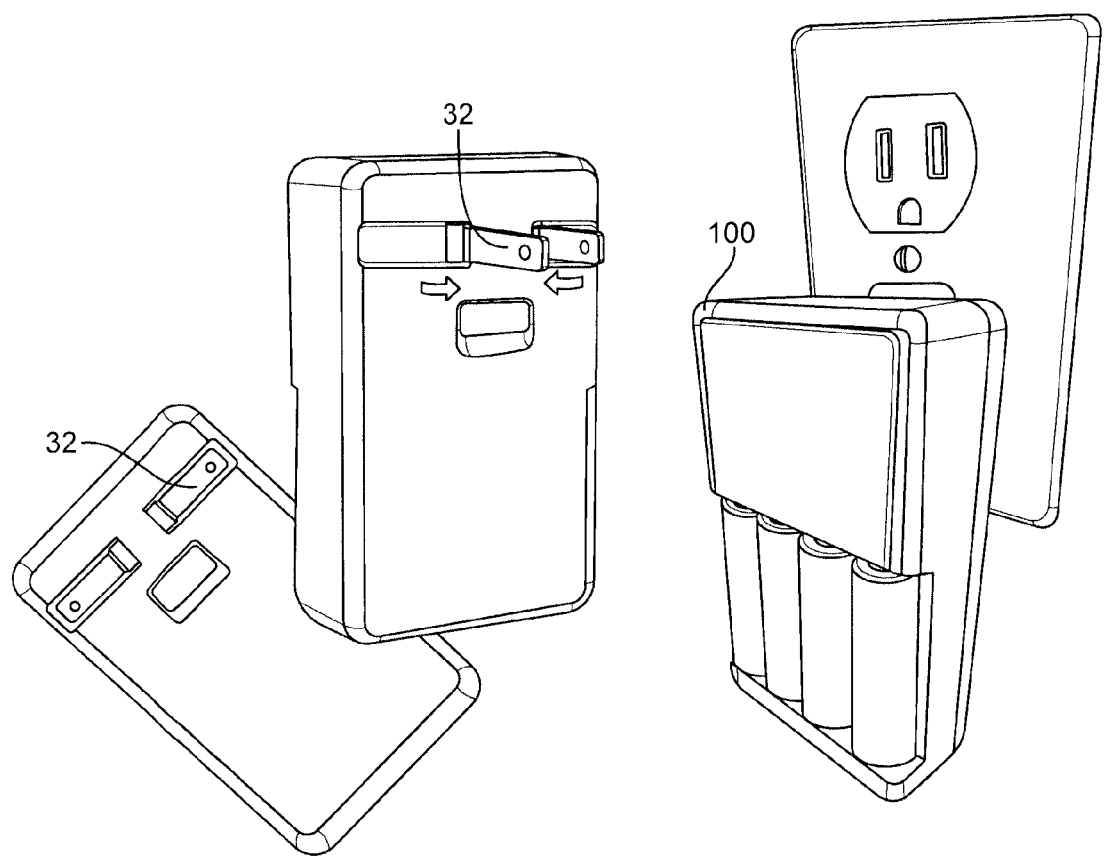
FIG. 16A is an illustration of the present invention incorporated into a plug-in battery recharger.

FIG. 16A shows the present invention incorporated into a plug-in battery recharger 100 (FIG. 16A).

Figure 16B:
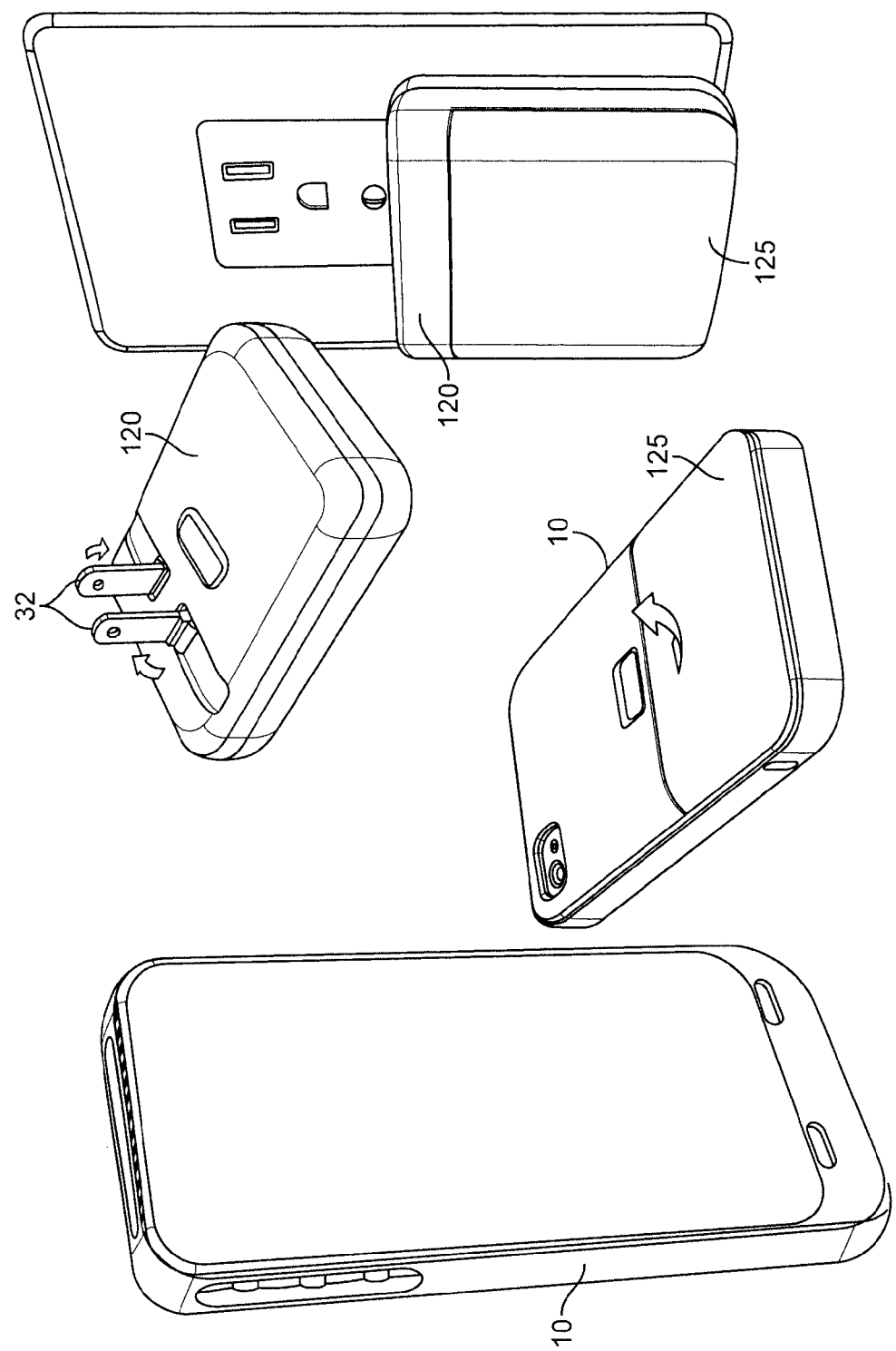
FIG. 16B is an illustration of the present invention incorporated into a smart-phone external battery charger.

FIG. 16B shows the present invention incorporated into a smart-phone external battery charger 120. Specifically, phone 10 has a battery/SIM card 125 that is removed and placed into external battery charger 120 which is in turn plugged into the wall.

Figure 16C:
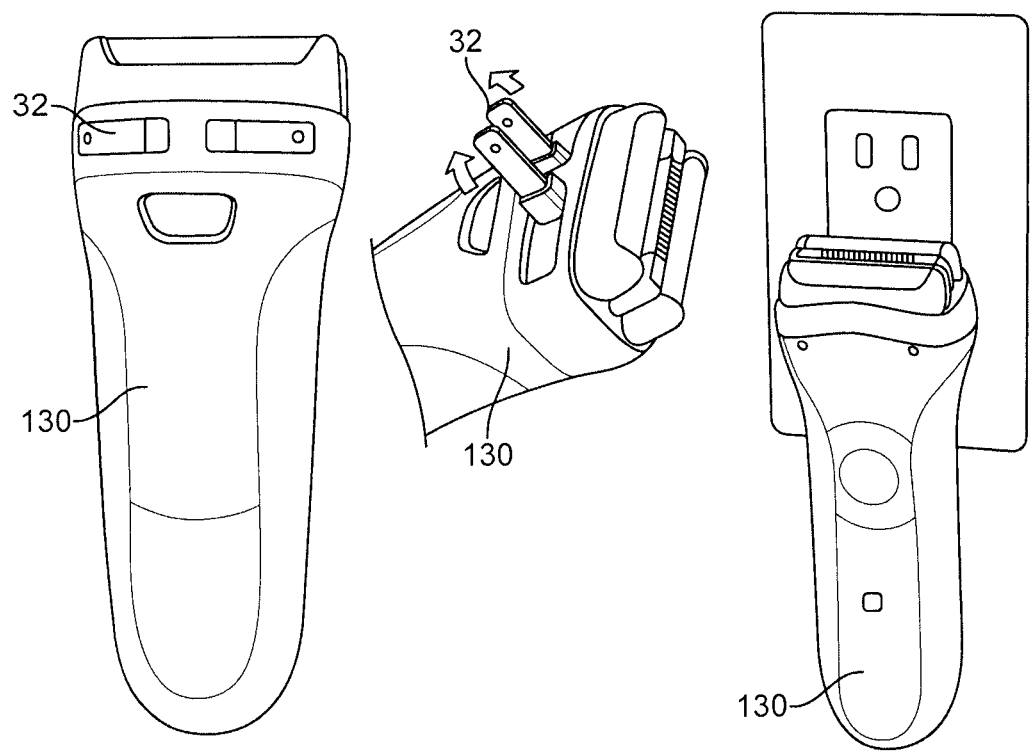
FIG. 16C is an illustration of the present invention incorporated into a hand-held electronic shaver.

FIG. 16C is an illustration of the present invention incorporated into a hand-held electronic shaver 130.

What is claimed is:

1. A smart phone charging device, comprising:
    (a) a housing;
    (b) a plug unit disposed in the housing, the plug unit having:
        (i) a pair of rotatable blades, wherein the blades are rotatable from a deployed position in which ends of the blades are positioned to be received within a wall outlet to a retracted position in which the ends of the blades are spread apart from one another; and
        (ii) a mechanism for rotating the blades from the retracted position to the deployed position;
    (c) electrical circuitry in the housing connecting the blades of the plug unit to a smart phone battery; and
    (d) a slide that is moveable between a first position that exposes the blades, and a second sliding position that substantially covers the blades.

2. A charging device, comprising:
    (a) a housing;
    (b) a plug unit disposed in the housing, the plug unit having:
        (i) a pair of rotatable blades, wherein the blades are rotatable from a deployed position in which ends of the blades are positioned to be received within a wall outlet to a retracted position in which the ends of the blades are spread apart from one another; and
        (ii) a mechanism for rotating the blades from the retracted position to the deployed position; and
    (c) electrical circuitry in the housing connecting the blades of the plug unit to a battery,
    wherein a base of each of the rotatable blades are mounted onto a spring biased rotatable member.

3. A charging device, comprising:
    (a) a housing;
    (b) a plug unit disposed in the housing, the plug unit having:
        (i) a pair of rotatable blades, wherein the blades are rotatable from a deployed position in which ends of the blades are positioned to be received within a wall outlet to a retracted position in which the ends of the blades are spread apart from one another; and
(ii) a mechanism for rotating the blades from the retracted position to the deployed position; and
(c) electrical circuitry in the housing connecting the blades of the plug unit to a battery,
wherein the housing is attached to a smart phone, and wherein the housing is attached to the bottom of the smart phone.

4. A charging device, comprising:
(a) a housing;
(b) a plug unit disposed in the housing, the plug unit having:
　(i) a pair of rotatable blades, wherein the blades are rotatable from a deployed position in which ends of the blades are positioned to be received within a wall outlet to a retracted position in which the ends of the blades are spread apart from one another; and
　(ii) a mechanism for rotating the blades from the retracted position to the deployed position;
(c) electrical circuitry in the housing connecting the blades of the plug unit to a battery; and
a spring biasing system that urges the blades into the deployed position.

5. The charging device of claim 4, further comprising:
a restraint mechanism for holding the blades in the retracted position, wherein releasing the restraint mechanism causes the blades to spring into their deployed position.

6. A charging device, comprising:
(a) a housing;
(b) a plug unit disposed in the housing, the plug unit having:
　(i) a pair of rotatable blades, wherein the blades are rotatable from a deployed position in which ends of the blades are positioned to be received within a wall outlet to a retracted position in which the ends of the blades are spread apart from one another; and
　(ii) a mechanism for rotating the blades from the retracted position to the deployed position;
(c) electrical circuitry in the housing connecting the blades of the plug unit to a battery; and
a latching mechanism for holding the blades in their retracted position comprising:
　a biasing spring for each blade;
　a roller from which each blade extends;
　a slot on the side of the roller;
　a moveable switch having a forward projection that is received within the slot on the side of the rollers; and
　a biasing spring that advances the moveable switch such that forward projection remains positioned within the slot on the side of the rollers thereby preventing the blades from rotating from their retracted position, but wherein manually sliding the moveable switch away from the blades causes the forward projection to slip out of the slots on the side of the rollers, thereby releasing the rollers causing the biasing springs to rotate the blades to their deployed positions.

7. A charging system for a smart phone, comprising:
(a) a smart phone having:
　(i) an internal battery, and
　(ii) a power connector configured to receive external power and transmit the power to the internal battery;
(b) a charging device, having:
　(i) a housing;
　(ii) a plug unit disposed in the housing, the plug unit having:
　　(a) a pair of rotatable blades, wherein the blades are rotatable from a deployed position in which ends of the blades are dimensioned to be received within a wall outlet to a retracted position in which the ends of the blades are spread apart from one another; and
　　(b) a mechanism for rotating the blades from the retracted position to the deployed position,
(iii) electrical circuitry in the housing connected to the blades of the plug unit, wherein the charging device further comprises a battery disposed in the housing.

* * * * *